(12) United States Patent
Fukuyama

(10) Patent No.: US 8,356,205 B2
(45) Date of Patent: Jan. 15, 2013

(54) DISK ARRAY DEVICE, DISK CONTROL DEVICE AND LOAD DISTRIBUTION METHOD IN DISK ARRAY DEVICE

(75) Inventor: Osanori Fukuyama, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 12/732,890

(22) Filed: Mar. 26, 2010

(65) Prior Publication Data

US 2010/0251015 A1    Sep. 30, 2010

(30) Foreign Application Priority Data

Mar. 27, 2009  (JP) ................................. 2009-079588

(51) Int. Cl.
*G06F 11/00* (2006.01)
(52) U.S. Cl. ........................................... 714/9
(58) Field of Classification Search ..................... 714/9
See application file for complete search history.

(56) References Cited

U.S. PATENT DOCUMENTS

| | | | |
|---|---|---|---|
| 6,604,176 B1 * | 8/2003 | MacLellan et al. | 711/149 |
| 6,622,214 B1 * | 9/2003 | Vogt et al. | 711/141 |
| 7,383,381 B1 * | 6/2008 | Faulkner et al. | 711/114 |
| 7,502,823 B2 * | 3/2009 | Garg et al. | 709/203 |
| 7,725,558 B2 * | 5/2010 | Dickenson | 709/215 |
| 7,886,114 B2 * | 2/2011 | Gotoh | 711/144 |
| 2004/0139365 A1 | 7/2004 | Hosoya | |
| 2006/0031389 A1 | 2/2006 | Shimozono et al. | |
| 2006/0059317 A1 * | 3/2006 | Kakeda | 711/145 |
| 2007/0061518 A1 * | 3/2007 | Gotoh | 711/130 |
| 2008/0270689 A1 * | 10/2008 | Gotoh | 711/113 |
| 2011/0125964 A1 | 5/2011 | Fujibayashi et al. | |

FOREIGN PATENT DOCUMENTS

| | | |
|---|---|---|
| JP | 2004213125 A | 7/2004 |
| JP | 2005321854 A | 11/2005 |
| JP | 2006-107019 A | 4/2006 |
| JP | 2006-252019 A | 9/2006 |
| JP | 2007207007 A | 8/2007 |

OTHER PUBLICATIONS

Japanese Office Action for JP2009-079588 mailed on Oct. 16, 2012.

* cited by examiner

*Primary Examiner* — Amine Riad

(57) ABSTRACT

Degree of freedom of a device structure is increased to equalize processor loads by separating the function of executing data read and write processing from the host interface and the disk interface. A disk array device including a disk enclosure and a disk control unit, wherein the disk control unit includes a host interface connected to a host computer which accesses the disk array device, a disk interface connected to the disk enclosure, a plurality of processors that execute data read and write processing between the host computer and the disk enclosure, and a switch which connects the host interface and the disk interface, and the plurality of processors, wherein the switch having a function of selecting a processor which executes the data read and write processing.

18 Claims, 13 Drawing Sheets

CACHE MANAGEMENT TABLE

| HDD/ADDRESS | TIME AND DATE | USE FREQUENCY | PROCESSOR |
|---|---|---|---|
| HDD80/ad001 | 10:56:01 | 2 | PROCESSOR 10 |
| HDD80/ad005 | 11:02:10 | 6 | PROCESSOR 15 |
| ⋮ | ⋮ | ⋮ | ⋮ |

DISK ARRAY DEVICE, DISK CONTROL DEVICE AND LOAD DISTRIBUTION METHOD IN DISK ARRAY DEVICE

This application is based upon and claims the benefit of priority from Japanese patent application No. 2009-079588, filed on Mar. 27, 2009, the disclosure of which is incorporated herein in its entirety by reference.

TECHNICAL FIELD

The present invention relates to a disk array device which enables the degree of freedom of expansion to be increased and a disk control device thereof, and a load distribution method in a disk array device which enables the degree of freedom of expansion to be increased.

BACKGROUND ART

FIG. 16 shows an example of a structure of a disk array device according to related art. A disk control device of the disk array device comprises host interfaces (Host I/F) 501 and 502 to be connected to a host computer which accesses to the disk array device, a plurality of disk interfaces (Disk I/F) 503 and 504 to be connected to a disk enclosure, a plurality of processors 201 through 204 which execute processing of writing and reading data to/from the host computer and the disk enclosure, and switches 400 and 401 which connect the host interface and the disk interface, and a plurality of processors. In the figure, the interface indicated as xxI/F functions as either a host interface or a disk interface.

The host interfaces 501 and 502 and the disk interfaces 503 and 504 each have a processor 600 which, upon receiving an access request from the host computer, selects a plurality of processors which execute data read and write processing and communicate with the selected processors, and they are each structured by the same unit as that of the processor 600. The processors 201 through 204 have caches 301 through 304.

In the conventional disk array device shown in FIG. 16, assignment of the processors 201 through 204 to the host interfaces 501 and 502 and the disk interfaces 503 and 504 is fixed to fix an internal flow of data.

Related art of thus structured disk array device is recited, for example, in Patent Literature 1 and Patent Literature 2.
Patent Literature 1: Japanese Patent Laying-Open No. 2006-107019.
Patent Literature 2: Japanese Patent Laying-Open No. 2006-252019.

The structure of the above-described disk array device according to the related art has the following problems.

First problem is that because assignment of processors to a host interface and a disk interface is fixed, the degree of freedom of unit expansion is low, so that an optimum structure is hard to be adopted according to costs and necessary performance of a disk array device.

Second problem is that because assignment of processors to a host interface and a disk interface is fixed, under some conditions of use of a disk array device, it is impossible to distribute processor loads, so that a heavy load processor is liable to bottleneck performance of the entire device.

Third problem is that because processors on a host interface and a disk interface select a processor which will execute data read and write processing and communicate with the selected processor, this is one of factors in increasing a load on a processor which executes data read and write processing.

Fourth problem is that because a host interface and a disk interface comprise a processor which selects a plurality of processors that execute data read and write processing and communicates with the selected processors, a unit forming the host interface and the disk interface is increased in size to limit the number of interfaces mounted.

OBJECT OF INVENTION

An object of the present invention is to provide a disk array device which solves the problem that assignment of processors to a host interface and a disk interface is fixed and increases the degree of freedom of a structure of the device, while being allowed to adopt an optimum structure according to costs and necessary performance, a disk control device and a load distribution method in the disk array device.

Another object of the present invention is to provide a disk array device which solves the problem that a heavy load processor is liable to bottleneck performance of the entire device as a result of distribution of loads of the processors, a disk control device and a load distribution method in the disk array device.

A further object of the present invention is to provide a disk array device which solves the problem that a unit forming the host interface and the disk interface is increased in size to limit the number of interfaces mounted, a disk control device and a load distribution method in the disk array device.

SUMMARY

According to a first exemplary aspect of the invention, a disk array device including a disk enclosure and a disk control unit, wherein the disk control unit includes a host interface connected to a host computer which accesses the disk array device, a disk interface connected to the disk enclosure, a plurality of processors that execute data read and write processing between the host computer and the disk enclosure, and a switch which connects the host interface and the disk interface, and the plurality of processors, wherein the switch having a function of selecting a processor which executes the data read and write processing.

According to a second exemplary aspect of the invention, a disk control device which controls an access to a disk array device from a host computer, includes a host interface connected to a host computer which accesses the disk array device, a disk interface connected to the disk enclosure, a plurality of processors which execute data read and write processing between the host computer and the disk enclosure, and a switch which connects the host interface and the disk interface, and the plurality of processors, wherein the switch having a function of selecting a processor which executes the data read and write processing.

According to a third exemplary aspect of the invention, a load distribution method of a disk array device including a disk enclosure and a disk control unit which controls an access from a host computer, wherein a switch, which connects a host interface connected to the host computer that accesses the disk array device, a disk interface connected to the disk enclosure, and a plurality of processors that execute data read and write processing between the host computer and the disk enclosure, selects a processor that executes the data read and write processing.

The present invention enables assignment of processors to a host interface and a disk interface to be freely set through a switch and enables expansion and reduction at will according to costs and necessary performance of a disk array device.

EXEMPLARY EMBODIMENT

Next, exemplary embodiments of the present invention will be described in detail with reference to the drawings.

First Exemplary Embodiment

Figure 1:
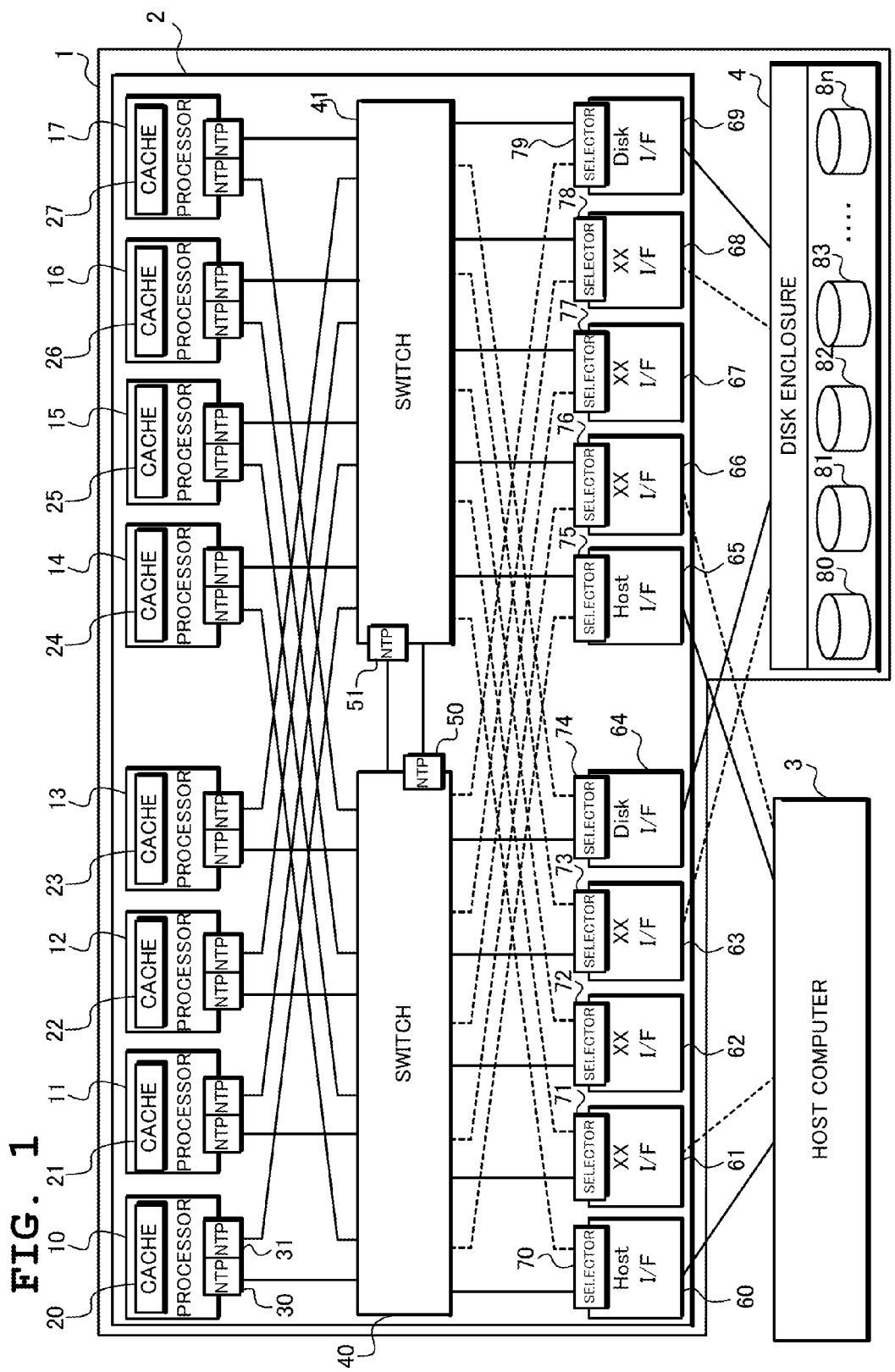
FIG. 1 is a block diagram showing an example of a structure of a disk array device according to a first exemplary embodiment of the present invention.

FIG. 1 shows an example of a structure of a disk array device according to a first exemplary embodiment of the present invention. In the figure, a disk array device 1 is structured to comprise a disk control unit 2 and a disk enclosure 4, to/from which data is written and read by a host computer 3 connected.

The disk control unit 2 comprises processors (PU) 10 through 17, switches 40 and 41, host interfaces (I/F) 60 and 65 and disk interfaces (I/F) 64 and 69. All the processors, host interfaces and disk interfaces are connected to the two switches 40 and 41 through a PCI Express bus.

The processors 10 through 17 comprise a parity generation function for data transfer or RAID structuring, and caches 20 through 27 formed of a high-speed memory (DRAM (Dynamic Random Access Memory)) for temporarily caching data or the like. The processors are connected to the switches 40 and 41 by the PCI Express through NTPs (Non Transparent Port) 30 and 31.

All the processors 10 through 17 and the switches 40 and 41 have a root complex function for a PCI Express, and data transfer, for example, between the processor 10 and the switch 40, is executed through the NTP 30. This is also the case with data transfer between other processors and switches.

The switches 40 and 41 are connected also by the PCI Express bus, whose data transfer is executed through an NTP 50 and an NTP 51.

With the cache memory 20, the processor 10 temporarily preserves, in the cache memory 20, data written from the host computer 3 through the host interfaces 60 and 65 and the switches 40 and 41 until the data is written to the disk enclosure 4 through the switches 40 and 41 and the disk interfaces 64 and 69. This is also the case with the processors 11 through 17.

Although eight processors 10 through 17 are illustrated in FIG. 1, the number of processors is not limited thereto and it may be less or more than eight and can be increased or decreased according to costs or necessary performance of the disk array device. Also in FIG. 1, although shown is a structure comprising two switches 40 and 41, the number of switches is not limited to two. The switch may be, for example, one in a third exemplary embodiment as will be described later or three or more switches may be comprised.

The switches 40 and 41 have a switching function and a root complex function for a PCI Express and execute configuration of the PCI Express bus with respect to the host interfaces 60 and 65, the disk interfaces 64 and 69 and xxI/F 61 through 63 and 66 through 68 connected by the PCI Express bus. The switches 40 and 41 change setting of the host interface or the disk interface according to a load or a usage of the disk array device and freely select to which of the processors 10 through 17 a data transfer destination is to be assigned.

Figure 2:
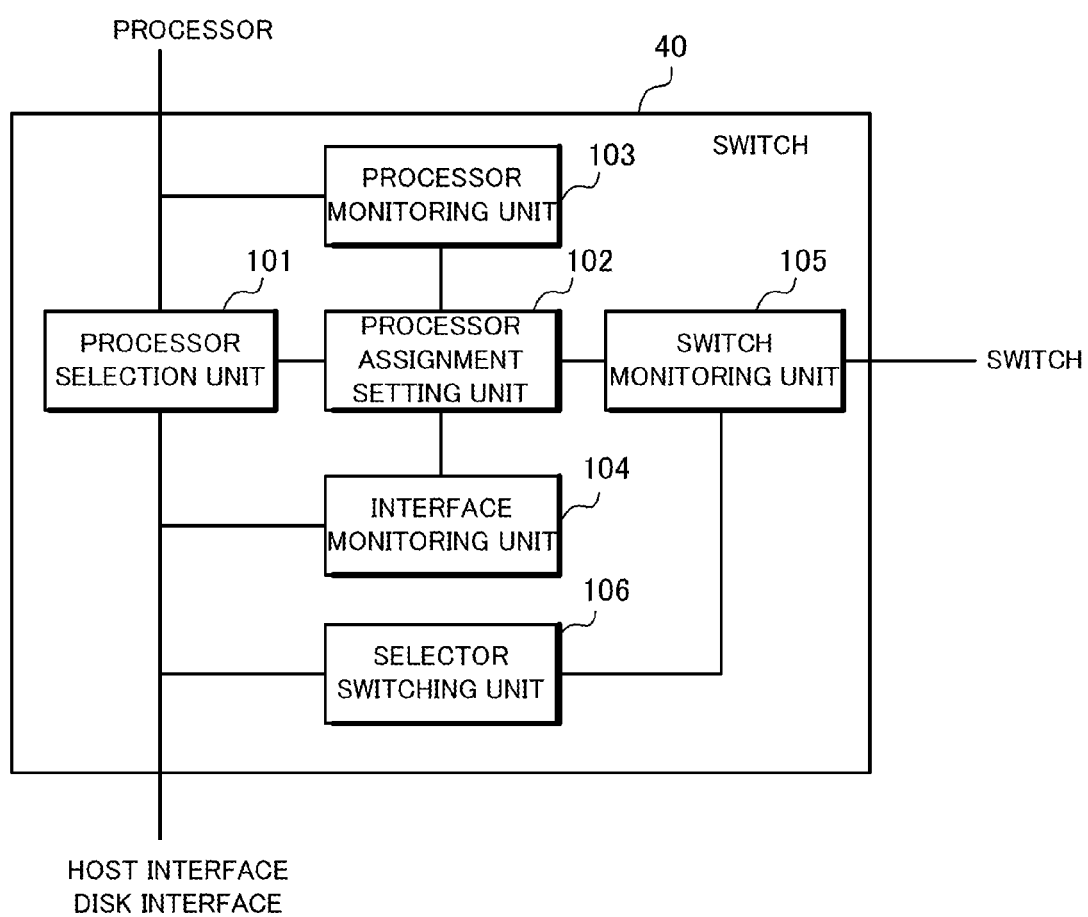
FIG. 2 is a block diagram showing an example of a structure of a switch of a disk control device according to the first exemplary embodiment.

Example of a structure of the switches 40 and 41 according to the present exemplary embodiment is shown in FIG. 2. As illustrated in FIG. 2, the switches 40 and 41 each include a processor selection unit 101, a processor assignment setting unit 102, a processor monitoring unit 103, an interface monitoring unit 104, a switch monitoring unit 105 and a selector switching unit 106.

The processor selection unit 101 has a function of accepting an interruption from the host interfaces 60 and 65 to cause an interruption to the processor when the host computer 3 writes or reads data to/from the disk array device 1.

At this time, the processor selection unit 101 refers to a load condition of each processor obtained by the processor monitoring unit 103 and selects a processor whose load is lightest at that time point from among processors assigned in a processor assignment table of the processor assignment setting unit 102 to cause an interruption to the selected processor.

Figure 3:
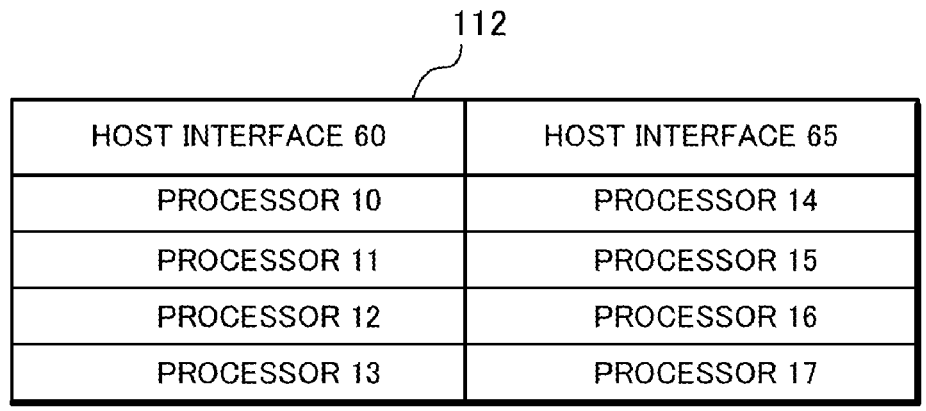
FIG. 3 is a diagram showing an example of a structure of a processor assignment table that the switch of the disk control device has according to the first exemplary embodiment.

The processor assignment setting unit 102 has a function of setting assignment of processors to the host interfaces 60 and 65 at such a processor assignment table 112 as shown in FIG. 3 in order to prevent the switches 40 and 41 from assigning the same data to the same processor.

In the example shown in FIG. 3, to the host interface 60, the processors 10 through 13 and to the host interface 65, the processors 14 through 17 are assigned.

When notified of a failure of a processor by the processor monitoring unit 103 and when notified of a failure of a host interface by the interface monitoring unit 104, the processor assignment setting unit 102 changes the above-described processor assignment table 112 to change assignment of the processors.

Figure 4:
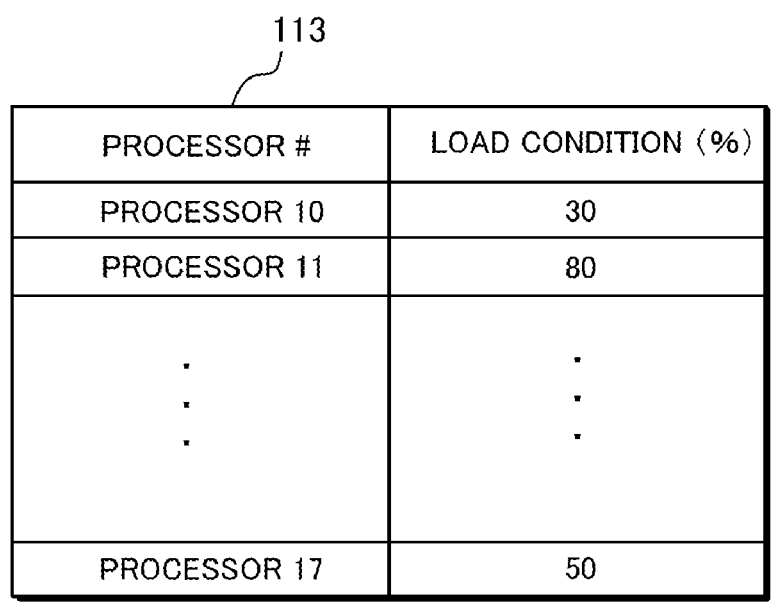
FIG. 4 is a diagram showing an example of a structure of a load condition table that the switch of the disk control device has according to the first exemplary embodiment.

The processor monitoring unit 103, which has a function of monitoring a load condition of each processor by periodically communicating with the processors 10 through 17, records a load condition of each processor in such a load condition table 113 as shown in FIG. 4.

The interface monitoring unit 104 has a function of monitoring the host interfaces 60 and 65, the disk interfaces 64 and 69 and the xxI/Fs 61 through 63 and 66 through 68 connected to its own switch and when a failure occurs, notifying the failure to the processor assignment setting units 102 of its own switch and other switches.

The switch monitoring unit 105 has a function of communicating with other switch through the NTPs 50 and 51 to monitor whether they operate normally or not. The selector switching unit 106 has a function of switching, upon receiving a notification of a failure of a switch from the switch monitoring unit 105, selectors of the host interfaces 60, 65, the disk interfaces 64 and the 69 and the xxI/Fs 61 through 63 and 66 through 68 to the side of the switch not developing a fault.

For example, when the switch monitoring unit 105 of the switch 40 detects a fatal failure of the switch 41, the selector switching unit 106 having received a notification of a failure of the switch 41 operates selectors 75 through 79 of the host interface 65, the disk interface 69 and the xxI/Fs 66 through 68 and changes an upstream port of the PCI Express bus from the switch 41 side to the switch 40 side to cut off connection to the switch 41 side. When the switch 41 recovers from the failure, the selector switching unit 106 of the switch 41 operates the selectors 75 through 79 to again switch the upstream port to the switch 41 side.

The host interfaces 60 and 65, which have a function of an interface such as a fibre channel or iSCSI for the connection with the host computer 3, are connected to the host computer 3 to transmit and receive data to be written or read to/from the host computer 3 side. The host interfaces 60 and 65 are connected with the switch 40 or 41 by the PCI Express bus. The switch 40 functions as a root complex of the PCI Express bus and the host interface 60 functions as an end point of the PCI Express bus.

The host interfaces 60 and 65 are connected to either one of the switch 40 and the switch 41 by the selectors 70 and 75. At the time of switching the selectors 70 and 75, the host interfaces 60 and 65 are once reset to change setting of the PCI Express.

The disk interfaces 64 and 69, which have an interface function such as serial attached SCSI (SAS) or serial ATA (SATA) for the connection with the disk enclosure 4, are connected with the disk enclosure 4 to transmit and receive data to be written and read to/from the HDD (Hard Disk Drive) 80 through 8n. The interfaces are connected to the switches 40 and 41 by the PC Express to function as an end point.

The disk interfaces 64 and 69 are connected to either the switch 40 or the switch 41 by the selectors 74 and 79. Operation at the time of switching the selectors 74 and 79 is the same as that of a case of the host interface.

The interfaces indicated as the xxI/F 61 through 63 and 66 through 68 are interfaces which function as any of the host interfaces and the disk interfaces. An arbitrary interface can be selected according to costs and necessary performance of the disk array device. The number of xxI/Fs may be more or less than that of the structure example shown in FIG. 1. Also connection of the PCI Express bus and the operation of the selectors 74 and 79 are the same as those of other host interfaces and disk interfaces.

(Operation of the First Exemplary Embodiment)

Next, operation of the disk array device according to the first exemplary embodiment shown in FIG. 1 will be described.

Figure 5:
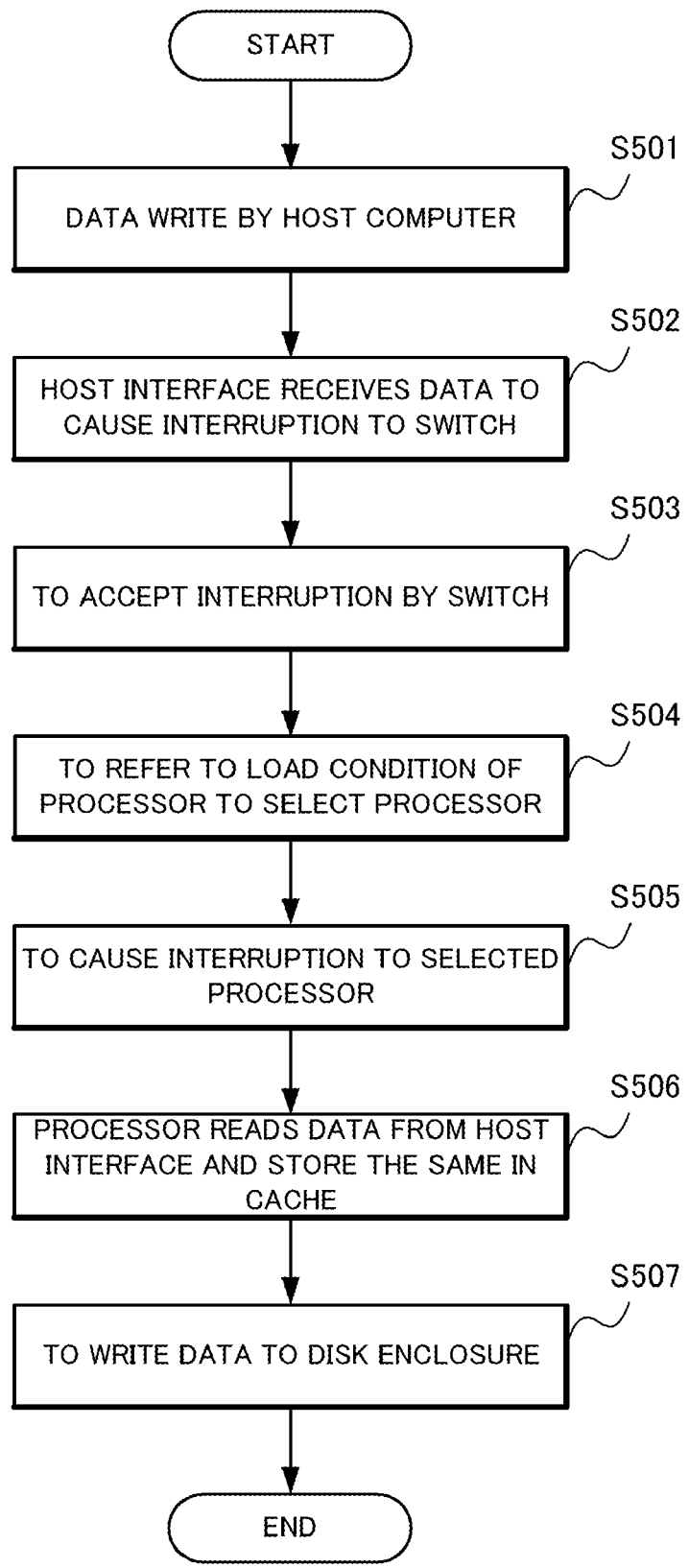
FIG. 5 is a flow chart showing entire operation executed when a data write request is made by a host computer in the first exemplary embodiment.

First, description will be made of operation executed when the host computer 3 writes data to the disk array device 1 with reference to the flow chart of FIG. 5.

When the host computer 3 writes data to the disk array device 1 (Step S501), the host interface 60 receives the data to cause an interruption to the switch 40 (Step S502).

The processor selection unit 101 of the switch 40 receives an interruption from the host interface 60 (Step S503) and refers to a load condition of each processor in the load condition table 113 of the processor monitoring unit 103 to select a processor whose load is the lightest at that point from among the processors assigned in the processor assignment table 112 of the processor assignment setting unit 102 (Step S504).

Then, the processor selection unit 101 causes an interruption to the selected processor (Step S505).

The processor 10~17 having received an interruption reads data from the host interface 60 and accumulates the data in its own cache 20~27 (Step S506). The information that the data is cached is notified also to other processor. At this time point, notify the host computer 3 of the write completion.

Thereafter, the data is written to the disk enclosure 4 from the processor 10~17 through the switch 40 or 41 and the disk interface 64 or 69 (Step S507).

Data in the caches 20 through 27 will be erased from the caches 20 through 27 when it is not referred to thereafter or new cache data is added. The information that the data is erased is notified also to other processors. Thus, all the processors 10 through 17 individually have information about which data is stored in its own cache and other caches.

Figure 6:
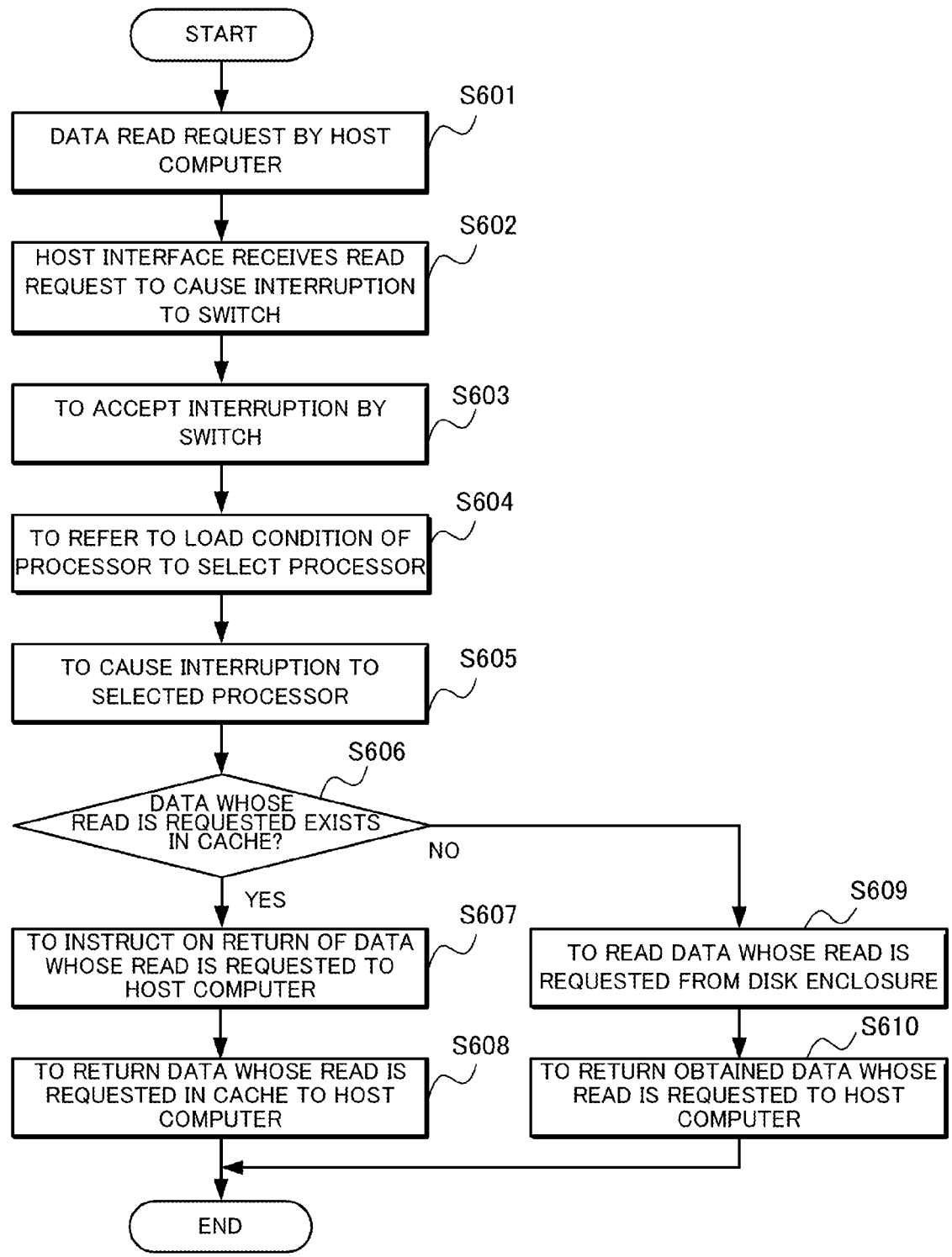
FIG. 6 is a flow chart showing entire operation executed when a data read request is made by the host computer in the first exemplary embodiment.

Next, description will be made of operation executed when the host computer 3 reads data from the disk array device 1 with reference to the flow chart of FIG. 6.

When the host computer 3 makes a data read request (Step S601), the host interface 60 receives the data read request to cause an interruption to the switch 40 (Step S602).

The processor selection unit 101 of the switch 40 receives the interruption from the host interface 60 (Step S603) and refers to a load condition of each processor in the load condition table 113 of the processor monitoring unit 103 to select a processor whose load is the lightest at that point from the processors assigned in the processor assignment table 112 of the processor assignment setting unit 102 (Step S604).

Then, the processor selection unit 101 causes an interruption to the selected processor (Step S605).

The processor 10~17 having received an interruption refers to information related to its held cache to check whether data whose read is requested is stored in the cache of any of the processors (Step S606).

When the data is stored, instruct the processor caching the data to return the data whose read is requested to the computer 3 through the switch 40 or 41 (Step S607).

The processor having received the instruction returns the data whose read is requested to the host computer 3 through the switch 40 and the host interface 60 (Step S608).

If none of the processors caches the data whose read is requested, the processor 12 reads the data whose read is requested from the disk enclosure 4 through the switch 40 or the switch 41 and through the disk interface 64 or 69 (Step S609).

Thereafter, the processor returns the data whose read is requested that is read and obtained from the disk enclosure 4 to the host computer 3 through the switch 40 and the host interface 60 (Step S610).

For example, when the data whose read is requested is accumulated in the cache 22 in the processor 12, the information that the data is cached will be notified also to other processors. When the data in the cache will not be referred to for a fixed time period or when new cache data is added, it will be erased from the cache. The information that the data is erased will be notified also to other processors. All the processors individually hold information about which data is recorded in its own cache and other caches.

Next, description will be made of operation executed when a part of the unit of the disk control unit 2 develops a fault.

(1) When Processor Develops Fault

Figure 7:
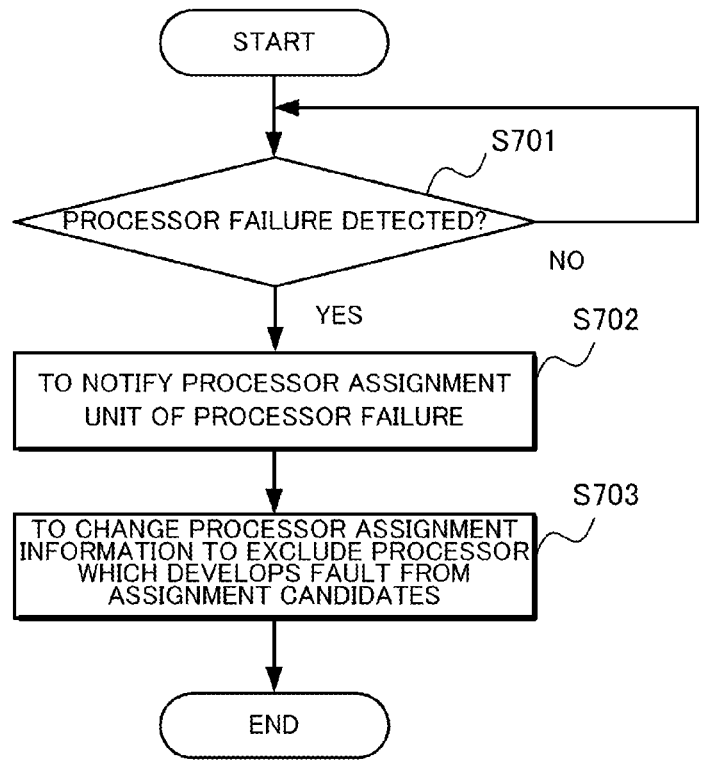
FIG. 7 is a flow chart showing processing contents executed when a processor of the disk control device develops a fault in the first exemplary embodiment.

Contents of processing to be executed when the switch 40 or 41 detects a failure of the processor will be described with reference to the flow chart shown in FIG. 7.

When the processor 10 develops a fault, for example, the processor monitoring units 103 of the switches 40 and 41 which periodically communicate with all the processors detect the failure of the processor 10 (Step S701) and notify the processor assignment units 102 of the failure of the processor 10 (Step S702).

The processor assignment setting unit 102 changes the processor assignment table 112 to exclude the processor 10 whose failure is notified from assignment (Step S703) and thereafter refrains from causing an interruption to and other communication with the processor 10.

Even when there exists cache data yet to be written to the disk enclosure 4 in the processor 10, if the host computer 3 constantly writes the same data to both the host interfaces 60 and 65, and the switches 40 and 41 assign the processing of the data to another processor, data loss can be prevented.

For preventing the switches 40 and 41 from assigning the same data to the same processor, assignment should be limited to prevent overlap by, for example, changing assignment of processors to the host interface 60 to the processors 10 through 13 and assignment of processors to the host interface 65 to the processors 14 through 17. Degradation of performance caused by a failure will be 1/n×100%, with n as the number of processors.

(2) When Switch Develops Fault

Figure 8:
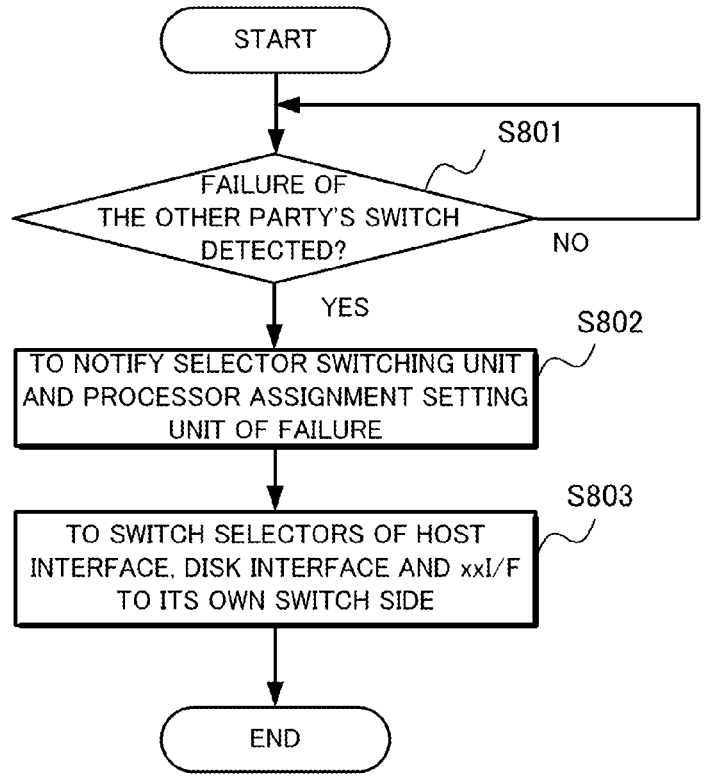
FIG. 8 is a flow chart showing processing contents executed when the switch of the disk control device develops a fault in the first exemplary embodiment.

Contents of processing to be executed when the switch 40 or 41 develops a fault will be described with reference to the flow chart shown in FIG. 8. Description will be here made of a case, for example, where the switch 40 develops a fault.

As described in the foregoing, the switch 40 and the switch 41 communicate with each other through the NTPs 50 and 51 to constantly monitor by means of its switch monitoring unit 105 whether the other side operates normally.

When the switch 40 develops a fault, the switch monitoring unit 105 of the switch 41 detects the fault (Step S801) to notify the selector switching unit 106 of the fault (Step S802).

The selector switching unit 106 switches the selectors 70 through 74 of the host interface 60, the disk interface 64 and the xxI/Fs 61 through 63 to the switch 41 side (Step S803). When one switch develops a fault, performance degradation will be 50% to the maximum.

(3) When Host Interface Develops Fault

Figure 9:
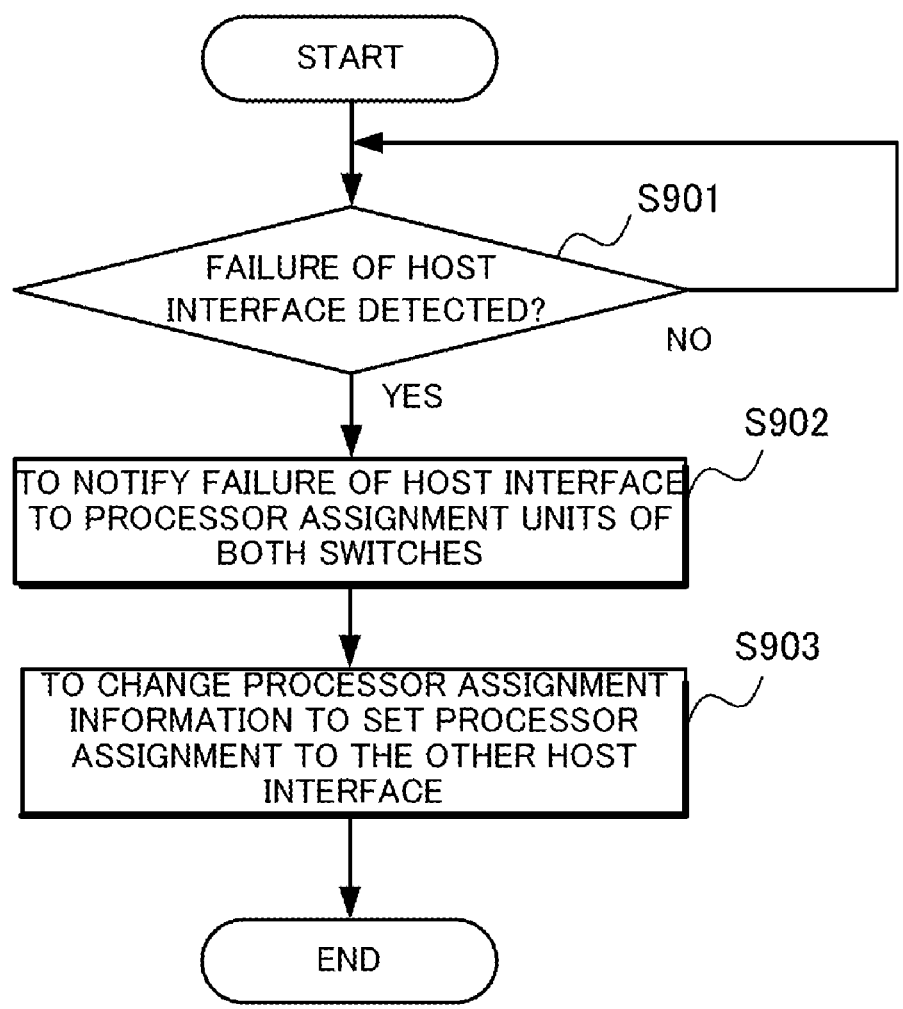
FIG. 9 is a flow chart showing processing contents executed when the host interface of the disk control device develops a fault in the first exemplary embodiment.

Contents of processing to be executed when the switch 40 or 41 detects a failure of the host interface will be described with reference to the flow chart shown in FIG. 9.

When the host interface 60 develops a fault, for example, the interface monitoring units 104 of the switch 40 as a root complex of the PCI Express detects the failure (Step S901) and notifies the processor assignment units 102 of the switches 40 and 41 of the failure (Step S902).

The processor assignment setting units 102 of the switch 40 and the switch 41 change the processor assignment table 112 to exclude the processor assigned to the host interface 60 whose failure is notified from assignment and set processor assignment to the host interface 65 side (Step S903).

Thus changing the processor assignment table 112 when the host interface 60 develops a fault results in accumulating data written from the host computer 3 into the cache in the assigned processor through the host interface 65 and the switch 41. Since the data is yet to be duplexed, the switch 41 issues an instruction to another processor to read data written in the cache in the processor and copy and accumulate the same in the cache.

At this time point, inform the host computer 3 of write completion for the first time. The notification of the write completion may be given to any of a processor assigned first and a processor to which copy is made. Seen from a host computer to which a host interface developing a fault is connected, performance degradation at the time of a failure will be 50% in read and a little worse in write (because procedure of copying write data is involved).

(Effects of the First Exemplary Embodiment)

Effects obtained by the first exemplary embodiment will be described.

First effect is enabling expansion and reduction at will according to costs and necessary performance of a disk array device because assignment of processors to a host interface and a disk interface is not fixed but freely set through a switch.

Second effect is enabling performance of a disk array device to be exhibited to the maximum because the switches 40 and 41 select a processor to which a read/write request from an interface is to be assigned according to the load of each processor, thereby distributing loads of the processors 10 through 17.

Third effect is enabling down-sizing of a unit forming a host interface and a disk interface to be realized and enabling more interfaces to be mounted because the function of a processor to select the processor 10~17 which execute data read from a host interface and a disk interface and communicate with the selected processor 10~17 is eliminated and provided in the switches 40 and 41.

Second Exemplary Embodiment

Figure 10:
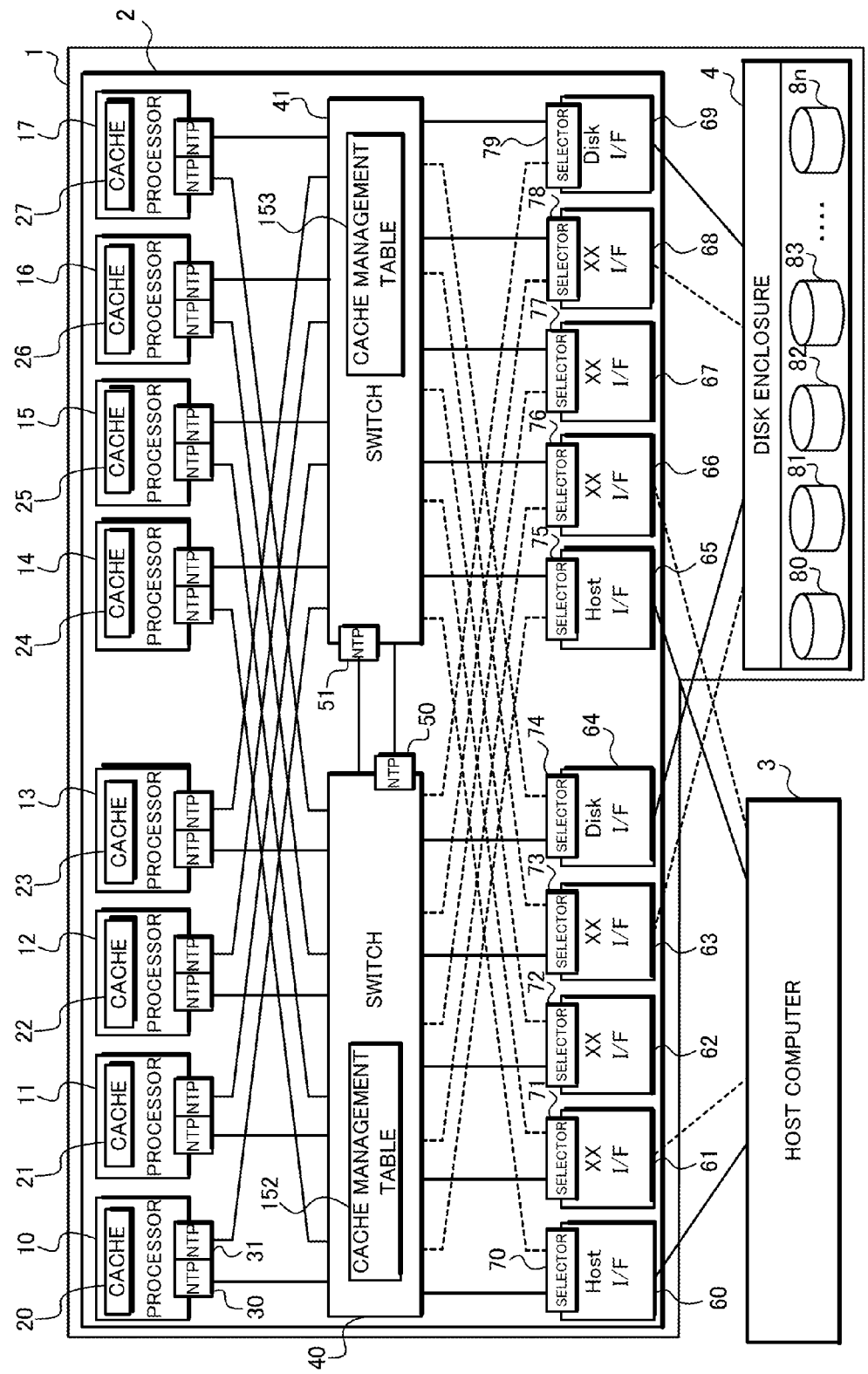
FIG. 10 is a block diagram showing an example of a structure of a disk array device according to a second exemplary embodiment of the present invention.

A disk array device according to a second exemplary embodiment of the present invention will be described with reference to FIG. 10.

Although a basic structure of the disk array device according to the second exemplary embodiment is the same as that of the first exemplary embodiment shown in FIG. 1, it is further improved for improving performance. As shown in FIG. 10, the disk array device according to the second exemplary embodiment is structured to additionally have cache management tables 152 and 153 in the switches 40 and 41.

Figures 11, 12:
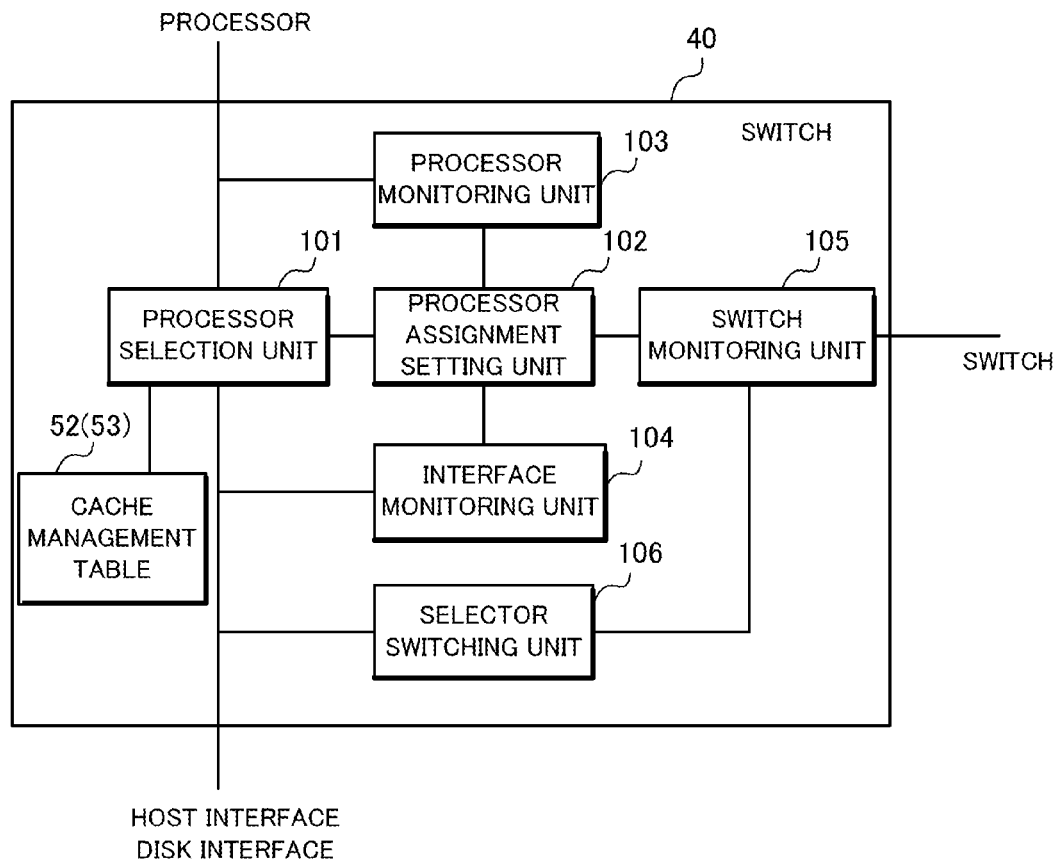
FIG. 11 is a block diagram showing an example of a structure of a switch of a disk control device according to the second exemplary embodiment.
FIG. 12 is a diagram showing an example of a structure of a cache management table that the switch of the disk control device has according to the second exemplary embodiment.

FIG. 11 is a block diagram showing an example of a structure of the switches 40 and 41 according to the second exemplary embodiment, in which the cache management tables 152 and 153 are provided in addition to the components of the first exemplary embodiment. The processor selection unit 101, when a processor to be processed is assigned, records information related to the assigned processor and data to be read/written in the cache management table 152 (153). Since the remaining components are the same as those of the first exemplary embodiment, no description will be made thereof.

The cache management tables 152 and 153 are tables for storing and managing in which processor which data is cached.

As shown in FIG. 12, when data of the HDD 80 through 8$n$ is stored in the cache of the processor, stored in the cache management tables 152 and 153 are information about to which sector of which of the HDD 80 through 8$n$ the data belongs, information indicative of time and date of storage, information about use frequency of data stored in the cache and information indicating which processor the data is stored.

While when a data read/write request is made by the host computer 3, the processor selection units 101 of the switch 40 and 41 execute work of assigning a processor which will execute processing, storing the assigned processor and data to be read/written in the cache management tables 152 and 153 at this time enables information related to a latest cache to be constantly held.

As a result, the need of transmitting and receiving information related to a cache between the processors will be eliminated to mitigate a load of the processor.

Since the cache management table 152 stores only information related to data assigned by its own switch 40, it is necessary to communicate with other switch 41 to synchronize the cache management tables 152 and 153. Therefore, the switches 40 and 41 communicate with each other through the NTPs 50 and 51 to synchronize such that the contents of the cache management tables 152 and 153 become the same.

For the processing of the cache management tables 152 and 153, processors to be mounted on the switches 40 and 41 are demanded to have higher performance than that of the basic structure. Similarly, a wider bandwidth is demanded for the PCI Express between the switches 40 and 41.

Thus, because the cache management tables 152 and 153 added to the switches 40 and 41 enable useless internal communication between the processors 10 through 17 to be omitted, the second exemplary embodiment enables the performance of the disk array device to be further improved.

Third Exemplary Embodiment

Figure 13:
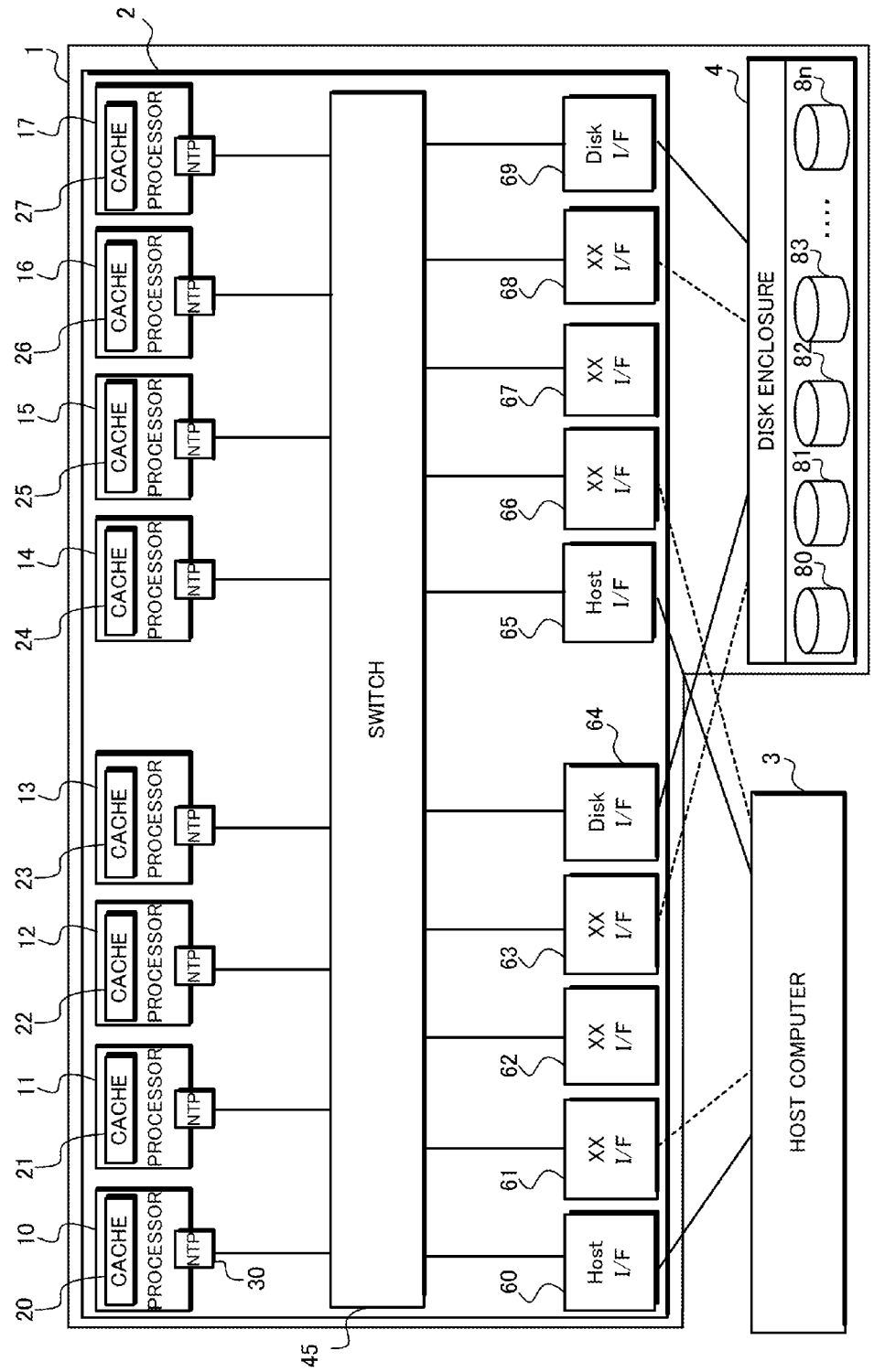
FIG. 13 is a block diagram showing an example of a structure of a disk array device according to a third exemplary embodiment of the present invention.

A disk array device according to a third exemplary embodiment of the present invention will be described with reference to FIG. 13.

While in the first exemplary embodiment and the second exemplary embodiment, the description has been made of the structure comprising the two switches 40 and 41, the structure may have one switch. As shown in FIG. 13, the disk array device according to the third exemplary embodiment is structured to comprise one switch 45. The processors 10 through 17 are connected to the switch 45 through the NTP 30 by one bus. In addition, the host interfaces 60 and 65, the disk interfaces 64 and 69 and the xxI/Fs 61 through 63 and 66 through 68 are connected to the switch 45 without passing through the selectors. Since the remaining part of the structure is the same as that of the first exemplary embodiment, no details will be described thereof.

Figure 14:
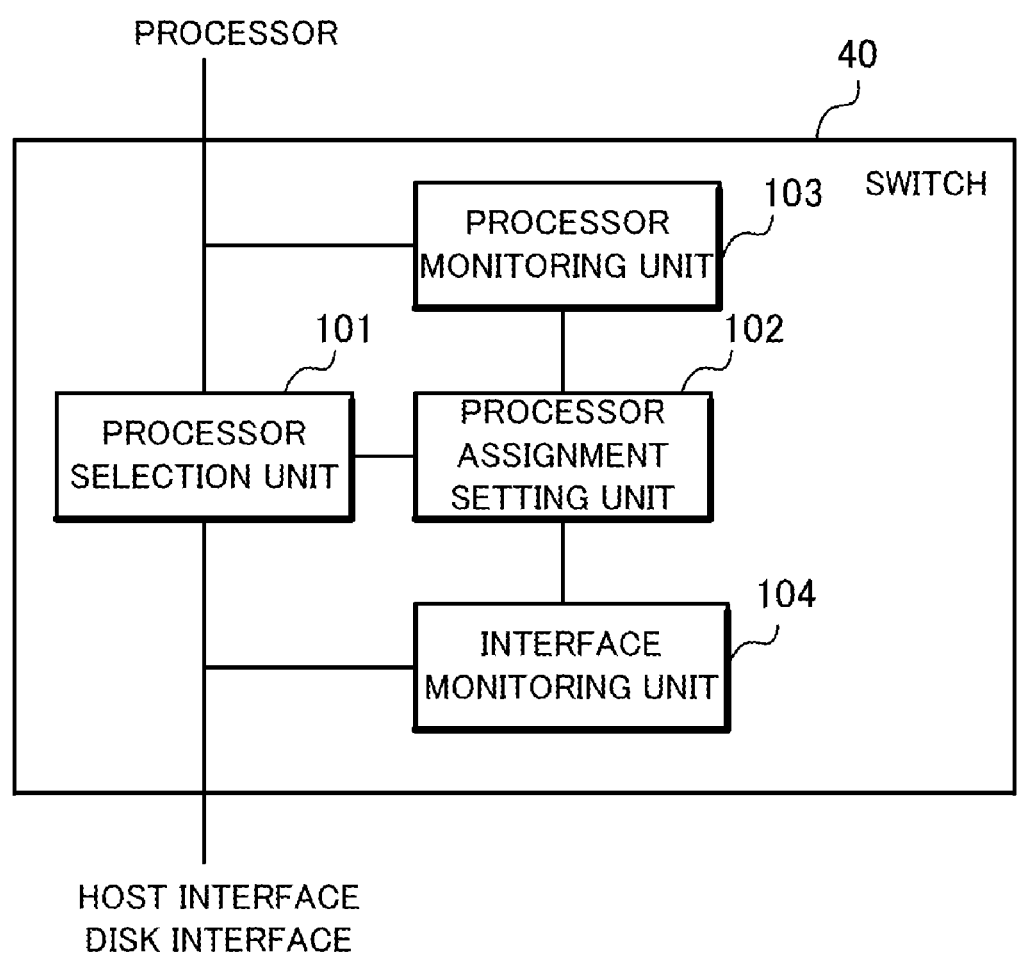
FIG. 14 is a block diagram showing an example of a structure of a switch of a disk control device according to the third exemplary embodiment.

Next, an example of a structure of the switch 45 is shown in FIG. 14. As shown in FIG. 14, the switch 45 includes the processor selection unit 101, the processor assignment setting unit 102, the processor monitoring unit 103 and the interface monitoring unit 104. The difference from the first exemplary embodiment is that the structure fails to include the switch monitoring unit 105 and the selector switching unit 106. Since functions of these components are the same as those of the first exemplary embodiment, no description will be made thereof.

In addition, operation to be executed when a data read/write request is made by the host computer 3 is also the same as the operation contents described with reference to FIG. 5 and FIG. 6. Furthermore, operation executed when a part of the unit of the disk control unit 2 develops a fault is the same as that executed when the processor develops a fault and operation executed when the host interface develops a fault is also the same as the operation contents described with reference to FIG. 7 and FIG. 9.

The third exemplary embodiment differs from the first exemplary embodiment in that since there exists one switch 45, when the switch develops a fault, none of such operation will be executed of operating the selectors of the host interfaces 60 and 65, the disk interfaces 64 and 69 and the xxI/Fs 61 through 63 and 66 through 68 to switch to the other switch side.

According to the third exemplary embodiment, the same effects as those of the above-described first exemplary embodiment can be attained in other part than selector switching due to a switch failure.

Moreover, according to the third exemplary embodiment, since no selector is required in the host interfaces 60 and 65, the disk interfaces 64 and 69 and the xxI/Fs 61 through 63 and 66 through 68 to reduce the number of wires between the switch and the processor, and the interfaces by half, it is possible to simplify an electric circuit in the disk array device to reduce costs of the product.

Lastly, description will be made of an example of a hardware structure of the switch with reference to FIG. 15.

Figure 15:
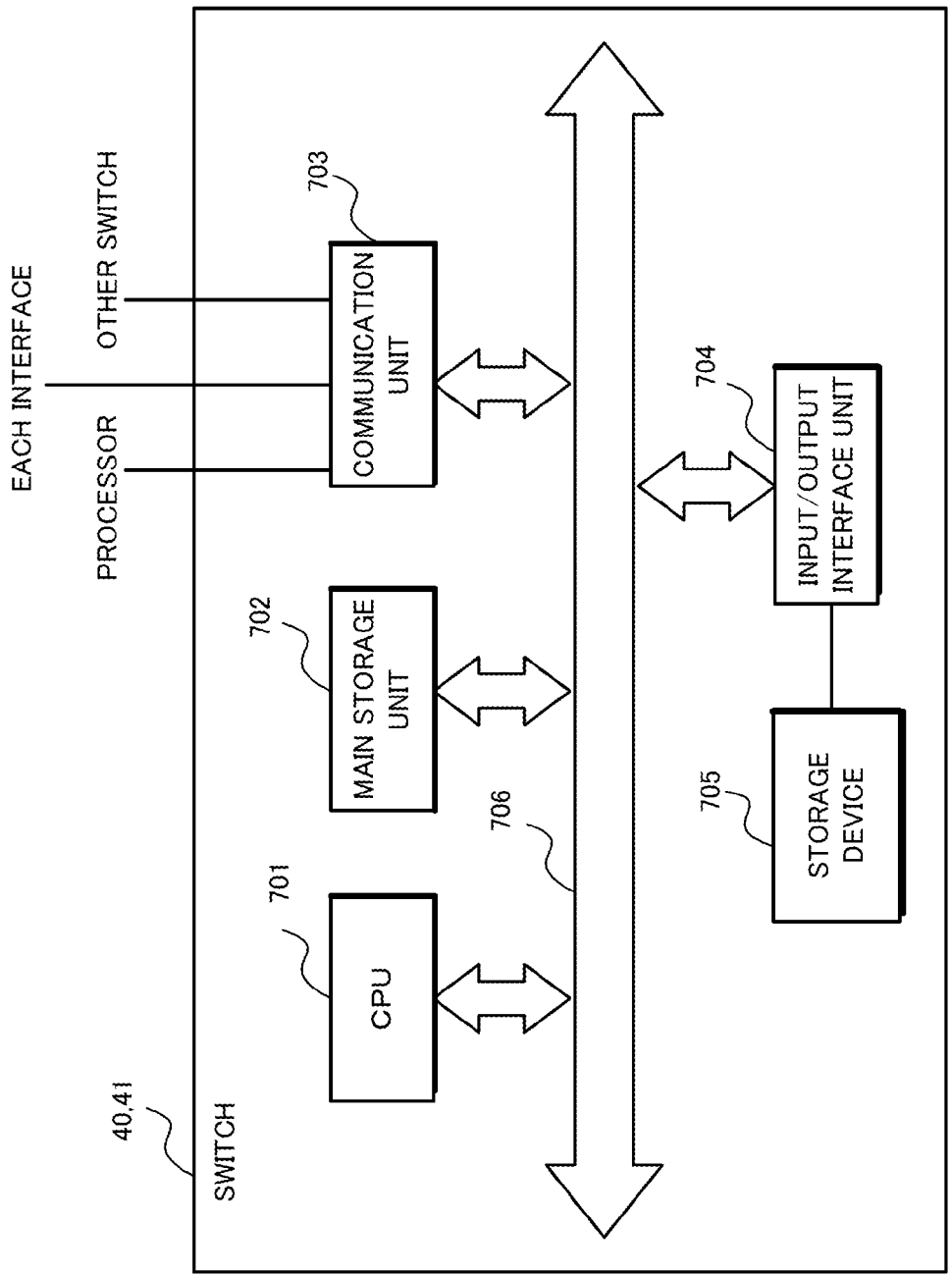
FIG. 15 is a block diagram showing an example of a structure of hardware of a switch according to the present invention.
Figure 16:
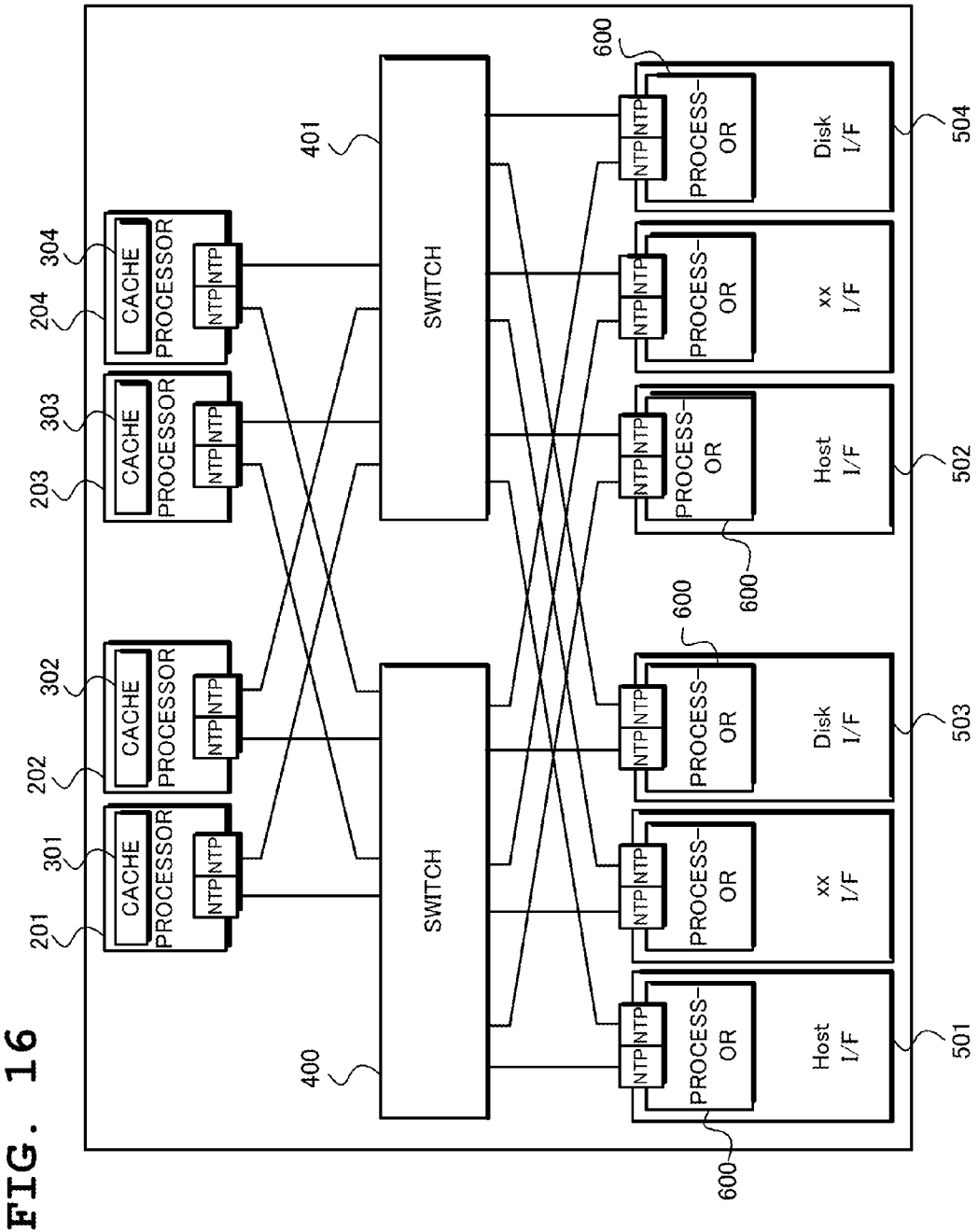
FIG. 16 is a block diagram showing an example of a structure of a disk array device according to the related art.

As shown in FIG. 15, the switches 40 and 41, which can be realized by the same hardware structure as that of a common computer device, comprises a CPU (Central Processing Unit) 701, a main storage unit formed of such a memory as a RAM (Random Access Memory) for use as a data working region or a data temporary saving region, a communication unit 703 for transmitting and receiving data, an input/output interface unit 704 connected with a storage device 705 for transmitting and receiving data, and a system bus 706 for connecting the above-described respective components with each other. As the communication unit 703, a common LSI for switching a PCI Express commercially available can be used. The storage device 705 is formed of a non-volatile memory such as a ROM (Read Only Memory), a magnetic disk or a semiconductor memory.

The switches 40 and 41 have their operation realized not only in hardware by mounting a circuit part as a hardware part such as an LSI (Large Scale Integration) having a program incorporated but also in software by storing, in the storage device 705, a program which provides the functions of the processor selection unit 101, the processor assignment setting unit 102, the processor monitoring unit 103, the interface monitoring unit 104, the switch monitoring unit 105, the selector switching unit 106 and the like and loading the program into the main storage unit 702 to execute the same on the CPU 701.

Although the present invention has been described with respect to the preferred exemplary embodiments and modes of implementation in the foregoing, the present invention is not necessarily limited to the above-described exemplary embodiments and modes of implementation and can be implemented in various modifications without departing from the scope of their technical ideas.

The whole or part of the exemplary embodiments disclosed above can be described as, but not limited to, the following supplementary notes.

(Supplementary note 1) A disk array device including a disk enclosure and a disk control unit, wherein the disk control unit comprising:

a host interface connected to a host computer which accesses the disk array device;

a disk interface connected to the disk enclosure;

a plurality of processors that execute data read and write processing between the host computer and the disk enclosure; and a switch which connects the host interface and the disk interface, and the plurality of processors, wherein the switch having a function of selecting a processor which executes the data read and write processing.

(Supplementary note 2) The disk array device according to Supplementary note 1, wherein the switch comprises a processor selection unit which, upon receiving an access request from the host computer which is received through the host interface, selects a processor which processes data read and write between the host computer and the disk enclosure from among the plurality of processors.

(Supplementary note 3) The disk array device according to Supplementary note 2, wherein the switch comprises a unit which monitors load conditions of the plurality of processors, and the processor selection unit selects a processor which processes write and read of data to/from the host computer according to a load condition of the processor.

(Supplementary note 4) The disk array device according to Supplementary note 2, which comprises the host interface in the plural, wherein the plurality of the host interfaces accept a write request from the host computer and the processor selection unit of the switch selects two processors which process the write request to send the write request to the two processors selected.

(Supplementary note 5) The disk array device according to Supplementary note 4, wherein the switch has a processor assignment table in which different the processor is each assigned to each of the host interfaces and selects the processor to which a read and write request from the host interface that is accepted by the host interface is to be sent by referring to the processor assignment table.

(Supplementary note 6) The disk array device according to Supplementary note 5, wherein the switch comprises a processor monitoring unit which monitors a failure of the processor, and a setting unit which, when the processor monitoring unit detects a failure of a processor, changes the processor assignment table to exclude the processor developing the fault from assignment.

(Supplementary note 7) The disk array device according to Supplementary note 5, wherein the switch comprises an interface monitoring unit which monitors a failure of the host interface and the disk interface, and a setting unit which, when the interface monitoring unit detects a failure of the host interface, changes the processor assignment table to exclude a processor assigned to the host interface developing the fault from assignment and assigns the processor excluded from the assignment to other host interface.

(Supplementary note 8) The disk array device according to Supplementary note 1, which comprises the switch in the plural, wherein the host interface and the disk interface are switchably connected to any of the plurality of the switches through a selector.

(Supplementary note 9) The disk array device according to Supplementary note 8, wherein the switch comprises a switch monitoring unit which communicates with the plurality of the switches to detect a failure of other switch, and a selector switching unit which, when the switch monitoring unit detects a failure of other switch, switches the selector to connect the host interface and the disk interface connected to the switch developing the fault to its own switch side.

(Supplementary note 10) The disk array device according to Supplementary note 1, wherein the switch comprises a cache management table which stores and manages information of data that the processor stores in a cache.

(Supplementary note 11) The disk array device according to Supplementary note 10, which synchronizes the plurality of switches such that the contents of a plurality of the cache management tables which the plurality of the switches comprise are the same.

(Supplementary note 12) A disk control device which controls an access to a disk array device from a host computer, comprising:

a host interface connected to a host computer which accesses the disk array device;

a disk interface connected to the disk enclosure;

a plurality of processors which execute data read and write processing between the host computer and the disk enclosure; and a switch which connects the host interface and the disk interface, and the plurality of processors, wherein the switch having a function of selecting a processor which executes the data read and write processing.

(Supplementary note 13) The disk control device according to Supplementary note 12, wherein the switch comprises a processor selection unit which, upon receiving an access request from the host computer which is received through the host interface, selects a processor which processes data read and write between the host computer and the disk enclosure from among the plurality of processors.

(Supplementary note 14) The disk control device according to Supplementary note 13, wherein the switch comprises a unit which monitors load conditions of the plurality of processors, and the processor selection unit selects a processor which processes write and read of data to/from the host computer according to a load condition of the processor.

(Supplementary note 15) The disk control device according to Supplementary note 13, which comprises the host interface in the plural, wherein the plurality of the host interfaces accept a write request from the host computer and the processor selection unit of the switch selects two processors which process the write request to send the write request to the two processors selected.

(Supplementary note 16) The disk control device according to Supplementary note 15, wherein the switch has a processor assignment table in which different the processor is each assigned to each of the host interfaces and selects the processor to which a read and write request from the host interface that is accepted by the host interface is to be sent by referring to the processor assignment table.

(Supplementary note 17) The disk control device according to Supplementary note 16, wherein the switch comprises a processor monitoring unit which monitors a failure of the processor, and a setting unit which, when the processor monitoring unit detects a failure of a processor, changes the processor assignment table to exclude the processor developing the fault from assignment.

(Supplementary note 18) The disk control device according to Supplementary note 16, wherein the switch comprises an interface monitoring unit which monitors a failure of the host interface and the disk interface, and a setting unit which, when the interface monitoring unit detects a failure of the host interface, changes the processor assignment table to exclude a processor assigned to the host interface developing the fault from assignment and assigns the processor excluded from the assignment to other host interface.

(Supplementary note 19) The disk control device according to Supplementary note 12, which comprises the switch in the plural, wherein the host interface and the disk interface are switchably connected to any of the plurality of the switches through a selector.

(Supplementary note 20) The disk control device according to Supplementary note 19, wherein the switch comprises a switch monitoring unit which communicates with the plurality of the switches to detect a failure of other switch, and a selector switching unit which, when the switch monitoring unit detects a failure of other switch, switches the selector to connect the host interface and the disk interface connected to the switch developing the fault to its own switch side.

(Supplementary note 21) The disk control device according to Supplementary note 12, wherein the switch comprises a cache management table which stores and manages information of data that the processor stores in a cache.

(Supplementary note 22) The disk control device according to Supplementary note 21, which synchronizes the plurality of switches such that the contents of a plurality of the cache management tables which the plurality of the switches comprise are the same.

(Supplementary note 23) A load distribution method of a disk array device including a disk enclosure and a disk control unit which controls an access from a host computer, wherein a switch, which connects a host interface connected to the host computer that accesses the disk array device, a disk interface connected to the disk enclosure, and a plurality of processors that execute data read and write processing between the host computer and the disk enclosure, selects a processor that executes the data read and write processing.

(Supplementary note 24) The load distribution method according to Supplementary note 23, wherein the switch, upon receiving an access request from the host computer which is received through the host interface, selects a processor which processes data read and write between the host computer and the disk enclosure from among the plurality of processors.

(Supplementary note 25) The load distribution method according to Supplementary note 24, wherein the switch monitors load conditions of the plurality of processors, and selects a processor which processes write and read of data to/from the host computer according to a load condition of the processor.

(Supplementary note 26) The load distribution method according to Supplementary note 24, which comprises the host interface in the plural, wherein the plurality of the host interfaces accept a write request from the host computer and the switch selects two processors which process the write request to send the write request to the two processors selected.

(Supplementary note 27) The load distribution method according to Supplementary note 26, wherein the switch selects the processor to which a read and write request from the host interface that is accepted by the host interface is to be sent by referring to a processor assignment table in which different the processor is each assigned to each of the host interfaces.

(Supplementary note 28) The load distribution method according to Supplementary note 27, wherein the switch monitors a failure of the processor, and when detecting a failure of the processor, changes the processor assignment table to exclude the processor developing the fault from assignment.

(Supplementary note 29) The load distribution method according to Supplementary note 27, wherein the switch monitors a failure of the host interface and the disk interface, and when detecting a failure of the host interface, changes the processor assignment table to exclude a processor assigned to the host interface developing the fault from assignment and assigns the processor excluded from the assignment to other host interface.

(Supplementary note 30) The load distribution method according to Supplementary note 23, comprising the switch in the plural, wherein the host interface and the disk interface are switchably connected to any of the plurality of the switches through a selector, the plurality of the switches communicate with each other to detect a failure of other switch, and when detecting a failure of other switch, the selector is switched to connect the host interface and the disk interface connected to other the switch developing the fault to its own switch side.

(Supplementary note 31) The load distribution method according to Supplementary note 23, wherein the switch records, in a cache management table, information of data that the processor stores in the cache.

(Supplementary note 32) The load distribution method according to Supplementary note 31, wherein the plurality of switches are synchronized such that the contents of the plurality of the cache management tables which the plurality of the switches comprise are the same.

(Supplementary note 33) A program operable on a disk array device including a disk enclosure and a disk control unit which controls an access from a host computer, which program causes a computer device, which device forms a switch that connects a host interface connected to the host computer which accesses the disk enclosure of the disk control device, a disk interface connected to the disk enclosure, and a plurality of processors which execute data read and write processing between the host computer and the disk enclosure, to execute processing of selecting a processor that executes the data read and write processing.

What is claimed is:

1. A disk array device including a disk enclosure and a disk control unit, wherein said disk control unit comprising:
    a host interface connected to a host computer which accesses said disk array device;
    a disk interface connected to said disk enclosure;
    a plurality of processors that execute data read and write processing between said host computer and said disk enclosure; and
    a switch which connects said host interface and said disk interface, and said plurality of processors,
    wherein said switch having a function of selecting a processor which executes said data read and write processing,
    wherein said switch comprises a cache management table which stores and manages information of data that said processor stores in a cache,
    wherein a plurality of switches including said switch are synchronized such that contents of a plurality of cache management tables including said cache management table which said plurality of switches comprise are identical.

2. The disk array device according to claim 1, which comprises said host interface in the plural, wherein
the plurality of said host interfaces accept a write request from said host computer and said processor selection unit of said switch selects two processors which process said write request to send said write request to the two processors selected.

3. The disk array device according to claim 2, wherein said switch has a processor assignment table in which different said processor is each assigned to each of said host interfaces and selects said processor to which a read and write request from said host interface that is accepted by said host interface is to be sent by referring to said processor assignment table.

4. The disk array device according to claim 3, wherein said switch comprises
a processor monitoring unit which monitors a failure of said processor, and
a setting unit which, when said processor monitoring unit detects a failure of a processor, changes said processor assignment table to exclude the processor developing the fault from assignment.

5. The disk array device according to claim 3, wherein said switch comprises
an interface monitoring unit which monitors a failure of said host interface and said disk interface, and
a setting unit which, when said interface monitoring unit detects a failure of said host interface, changes said processor assignment table to exclude a processor assigned to said host interface developing the fault from assignment and assigns the processor excluded from the assignment to other host interface.

6. The disk array device according to claim 1, wherein said switch is one switch of a plurality of switches of the disk control unit, wherein
said host interface and said disk interface are switchably connected to any of the plurality of said switches through a selector.

7. The disk array device according to claim 6, wherein said switch comprises
a switch monitoring unit which communicates with the plurality of said switches to detect a failure of other switch, and
a selector switching unit which, when said switch monitoring unit detects a failure of other switch, switches said selector to connect said host interface and said disk interface connected to said switch developing the fault to its own switch side.

8. The disk array device according to claim 1, wherein said switch comprises a processor selection unit which, upon receiving an access request from said host computer which is received through said host interface, selects a processor which processes data read and write between said host computer and said disk enclosure from among said plurality of processors.

9. The disk array device according to claim 8, wherein
said switch comprises a unit which monitors load conditions of said plurality of processors, and
said processor selection unit selects a processor which processes write and read of data to/from said host computer according to a load condition of said processor.

10. A disk control device which controls an access to a disk array device from a host computer, comprising:
a host interface connected to a host computer which accesses said disk array device;
a disk interface connected to said disk enclosure;
a plurality of processors which execute data read and write processing between said host computer and said disk enclosure; and
a switch which connects said host interface and said disk interface, and said plurality of processors,
wherein said switch having a function of selecting a processor which executes said data read and write processing,
wherein said switch comprises a cache management table which stores and manages information of data that said processor stores in a cache,
wherein a plurality of switches including said switch are synchronized such that contents of a plurality of cache management tables including said cache management table which said plurality of switches comprise are identical.

11. A load distribution method of a disk array device including a disk enclosure and a disk control unit which controls an access from a host computer, wherein a switch, which connects a host interface connected to the host computer that accesses said disk array device, a disk interface connected to said disk enclosure, and a plurality of processors that execute data read and write processing between said host computer and said disk enclosure, selects a processor that executes said data read and write processing,
wherein said switch comprises a cache management table which stores and manages information of data that said processor stores in a cache,
wherein a plurality of switches including said switch are synchronized such that contents of a plurality of cache management tables including said cache management table which said plurality of switches comprise are identical.

12. The load distribution method according to claim 11, which comprises said host interface in the plural, wherein
the plurality of said host interfaces accept a write request from said host computer and said switch selects two processors which process said write request to send said write request to the two processors selected.

13. The load distribution method according to claim 12, wherein said switch selects said processor to which a read and write request from said host interface that is accepted by said host interface is to be sent by referring to a processor assignment table in which different said processor is each assigned to each of said host interfaces.

14. The load distribution method according to claim 13, wherein said switch
monitors a failure of said processor, and
when detecting a failure of said processor, changes said processor assignment table to exclude the processor developing the fault from assignment.

15. The load distribution method according to claim 13, wherein said switch
monitors a failure of said host interface and said disk interface, and
when detecting a failure of said host interface, changes said processor assignment table to exclude a processor assigned to said host interface developing the fault from assignment and assigns the processor excluded from the assignment to other host interface.

16. The load distribution method according to claim 11, comprising said switch in the plural, wherein
said host interface and said disk interface are switchably connected to any of the plurality of said switches through a selector, the plurality of said switches communicate with each other to detect a failure of other switch, and when detecting a failure of other switch, said selector is switched to connect said host interface and said disk interface connected to other said switch developing the fault to its own switch side.

17. The load distribution method according to claim 11, wherein said switch, upon receiving an access request from said host computer which is received through said host interface, selects a processor which processes data read and write between said host computer and said disk enclosure from among said plurality of processors.

18. The load distribution method according to claim 17, wherein said switch monitors load conditions of said plurality of processors, and
selects a processor which processes write and read of data to/from said host computer according to a load condition of said processor.

* * * * *